Feb. 27, 1962  A. FROST  3,022,935
GAS BEARINGS
Filed Dec. 18, 1958  2 Sheets-Sheet 1

INVENTOR
ALAN FROST
BY Mawhinney & Mawhinney
ATTYS.

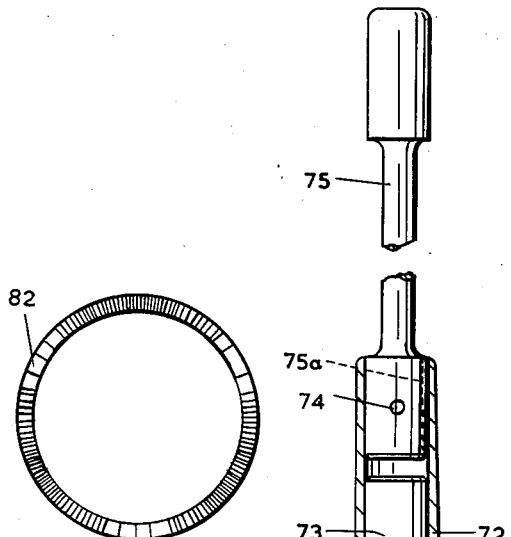
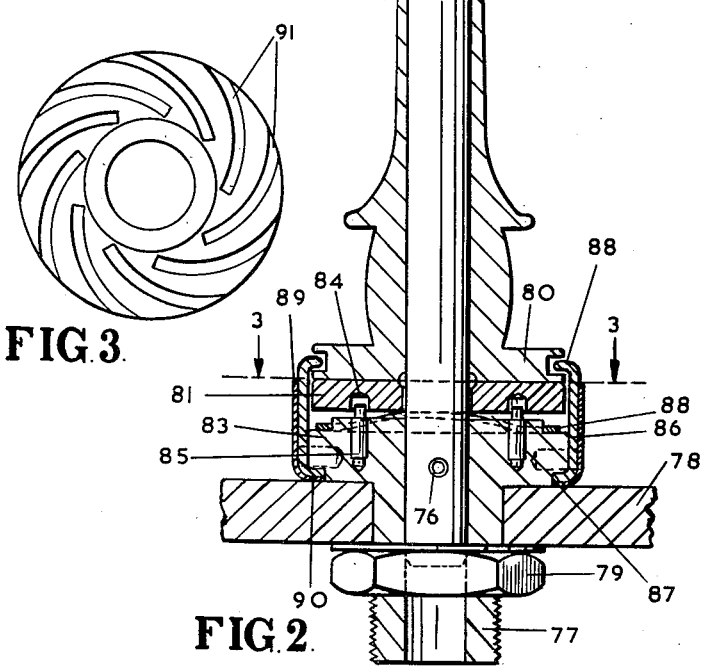

United States Patent Office 3,022,935
Patented Feb. 27, 1962

3,022,935
GAS BEARINGS
Alan Frost, Coventry, England, assignor, by mesne assignments, to Bristol Siddeley Engines Limited, Bristol, England, a British company
Filed Dec. 18, 1958, Ser. No. 781,366
Claims priority, application Great Britain Jan. 13, 1958
5 Claims. (Cl. 230—117)

The invention relates to a gas bearing, of the hydrodynamic type (i.e., one in which the pressure of the gas in the bearing depends solely upon the relative movement of the bearing surfaces, and not, as in the case of a gas bearing of the hydrostatic type, on a flow of pressurised gas between the bearing surfaces), for rotatively supporting a high-speed rotor (e.g., one running at more than 1000 r.p.m.). Attempts hitherto made for rotatively supporting such a rotor in this way have disclosed that there is considerable difficulty in achieving the extremely accurate alignment of two gas bearings in which are supported the opposite ends of a shaft carrying the rotor, and that as a long shaft reaches its critical speed at lower r.p.m. than a short one of the same diameter the two bearings, for very high speed rotors, had to be placed so close together as to impose an undesirable limit on the length of the rotor. The object of the invention is a method of rotatively supporting a high-speed rotor from a hydrodyamic gas bearing, which is not subject to these disadvantages.

The method of the invention involves using a stationary shaft, providing the rotor with a cylindrical bore to form a bearing surface with minute clearance from the coacting bearing surface of the shaft, and arranging for the ratio of the overlapped lengths of these bearing surfaces to their mean diameter to be such that a gas in the minute clearance will act as a sole lubricating fluid for the said surfaces.

The minute clearance must be such that the ratio of its radial width to the radius of the stationary shaft shall not exceed $50 \times 10^{-4}$; and the ratio of the overlapped lengths of the bearing surfaces to their mean diameter must not be less than 1 and is preferably not less than 3.

According to a further feature, at least one of the bearing surfaces is relieved intermediate its ends whereby to divide the bearing into at least two axially-spaced portions.

The invention also comprises a rotor and shaft combination in which the rotor has a coaxial bore, forming a bearing surface, and is journalled, with minute clearance, on a coacting bearing surface of a stationary shaft, the ratio of the overlapped lengths of these bearing surfaces to their mean diameter being such that a gas in the minute clearance will act as a sole lubricating fluid for the said surfaces. In such a combination, at least one of the bearing surfaces can be relieved intermediate its ends whereby to divide the bearing into at least two axially-spaced portions.

According to a still further feature, an electric-motor-driven compressor having the rotors of the motor and compressor aligned and fast with each other, and having the motor rotor rotatively supported according to the said method, has the stationary shaft sealingly supported at one end in a casing which, at the other end, has an inlet for the gas to be compressed and an outlet for the gas after compression, and there is a communication between the inlet, or the outlet, and the clearance of the bearing whereby the gas which is dealt with by the compressor also acts as lubricant for the bearing, the casing being otherwise hermetically sealed. Such an electric-motor-driven compressor is of particular use in cases where it would be undesirable for a liquid, or a solid lubricant to be allowed to contaminate the gas to be compressed.

According to yet another feature a textile spindle, which is to be driven at a high speed, is provided with an axial bore by which it is journalled, with minute clearance, on a vertical shaft in accordance with the invention, a gas thrust bearing being provided for the spindle when the latter is being driven. In such a case, and according to a further feature, one of the thrust bearing surfaces can be provided with shallow grooves to contain some of the gas so as to facilitate a break away from the metal to metal contact when the spindle commence to be driven. Such grooves are preferably of logarithmic spiral shape and of such hand and spiral angle as to promote an optimum shear effect on the gas in the trust bearing whereby to engender an optimum force tending to separate the two thrust-bearing surfaces.

In the accompanying drawings:

FIGURE 2 is a vertical section through a textile spinning spindle supported in the manner of the invention:

FIGURE 3 is a plan view, to a slightly enlarged scale and on the line 3—3 of FIGURE 2, of a thrust bearing shown in the latter figure, and FIGURE 4 is a plan view of a spring shown in FIGURE 2.

Figure 1:
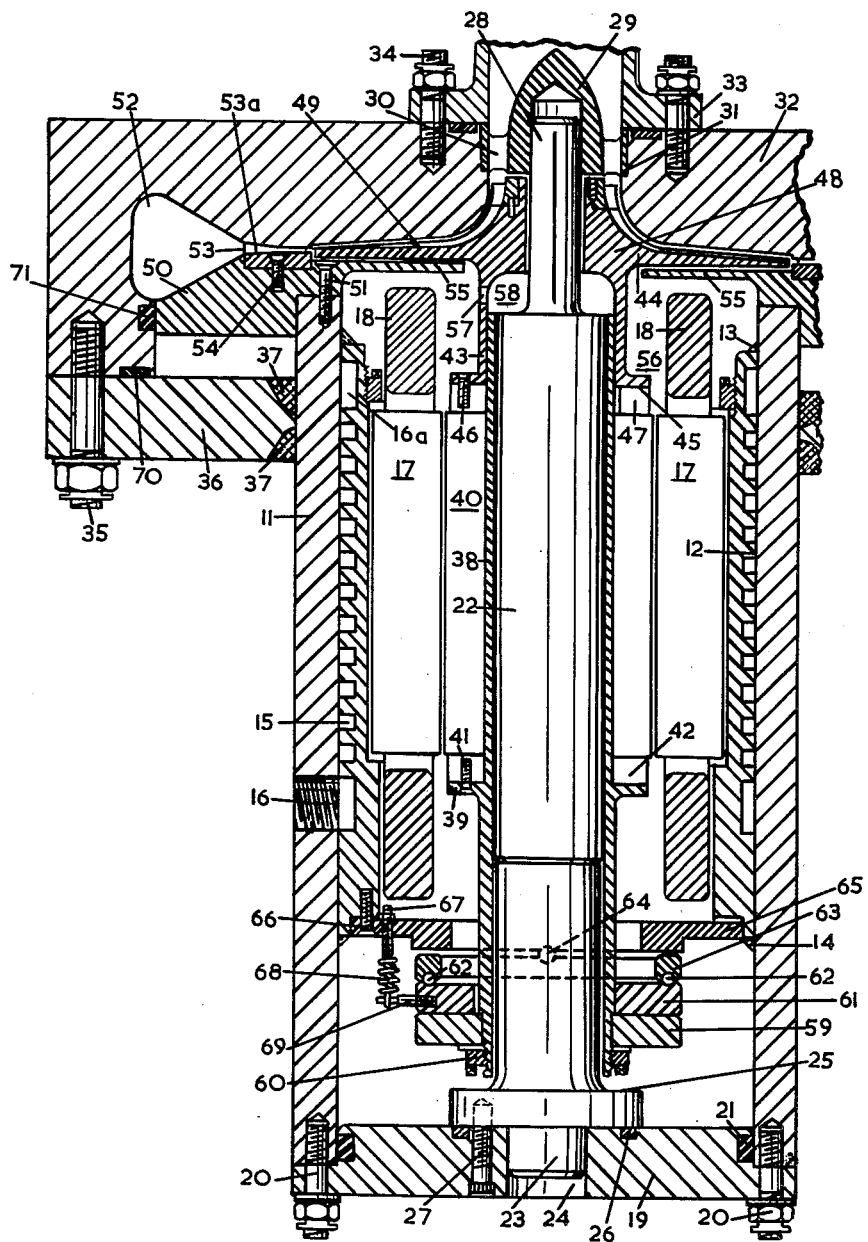
FIGURE 1 is a horizontal section with parts broken away, through an in-line electric-motor-driven compressor having the rotors of the motor and compressor supported in the manner of the invention.

Referring firstly to the construction illustrated by FIGURE 1, a cylindrical casing ist shown at 11 and it closely engages a coolant jacket 12 which is arranged around the electric-motor stator body 17, the jacket being welded to the casing 11 at 13 and 14. The jacket 12 has a helical passage 15 for a coolant which can enter through a union (not shown) to be engaged in a screw-threaded hole 16 of the casing 11 and which can afterwards be led away, by means (not shown), from an annular gallery 16a. The electric-motor field windings are shown at 18, 18.

The lower end (in the figure) of the casing 11 has a detachable end plate (19) which has a reduced-diameter portion fitting within the casing and is held in position by nuts on a circle of studs 20, 20, an annular seal 21 being provided in the said reduced-diameter portion of the end plate. One end of a stationary shaft 22 is provided with a reduced end portion 23 which is closely received in a central hole 24 of the end plate 19. This shaft has a radial flange 25 for abutting the inner surface of the said end plate, with an annular seal 26 between them, and the shaft is held stationary by a set-screw 27.

The opposite (or outer) end of the shaft 22 is of reduced diameter as indicated at 28 and engages within a nose bullet 29 at the gas inlet of the compressor. This nose bullet has integral radial guide vanes 30 which connect it to an outer ring 31, and the latter is held up to a shoulder, in a bore of an opposite end plate 32 of the casing, by an adapter 33 secured to the end plate 32 by nuts on a ring of studs 34. The end plate 32 itself is held in position by nuts on a ring of studs 35 extending through a radial plate 36 welded at 37, 37, to the exterior of the casing 11.

Journalled with minute clearance on the stationary shaft 22 is a sleeve 38 having, adjacent the inner end of the shaft, a radial flange 39 against which the inner end of the electric-motor-rotor 40 is made fast. This minute clearance is preferably such that the ratio of its radial width to the radius of the shaft 22 will be about $6 \times 10^{-4}$. As shown, the motor rotor 40 is made fast with the flange 39 by a ring of screws 41 engaged in a ring 42 cast on to the adjacent ends of the rotor conductors. The surface of the bore of the sleeve, and the coacting surface of the shaft are given the necessary quality of finish in accordance with the practice well-known in the gas bearing art, and the ratio of their overlapped lengths to the diameter of the shaft 22 is about 5.

Fitting over the other (or outer) end of the sleeve is an inwardly-directed tubular extension 43 of the compressor rotor 44, the extension having a radial flange 45 for securing, by a ring of screws 46, to a ring 47 cast on to the adjacent ends of the rotor conductors. In this way both the compressor rotor and the electric-motor-rotor are made fast with the sleeve 38.

The rotor 44 of the compressor, which is of a centrifugal type, also has an outwardly-directed tubular extension 48 which extends, with comfortable clearance from the reduced diameter portion 28 of the stationary shaft, to adjacent the inner end of the nose bullet 29 from which it has a small axial clearance as shown; and the compressor rotor blading 49 has working clearance only from the end plate 32. The latter, jointly with a ring 50, secured by a circle of screws 51 to the adjacent end of the casing 11, forms an outlet annulus 52 into which the compressor discharges. Diffuser blades 53 for the compressor are formed on a ring 53a which is secured to the ring 50 by a circle of screws 54.

The ring has a radially-inwardly directed flange 55 which forms part of the compressor stator casing and has clearance from the adjacent side of the rotor 44. This clearance establishes a communication between the inlet ends of the diffuser blades 53 and a chamber 56; and the latter communicates, through a hole 57 in the extension 43 with a chamber 58. The clearance between the shaft portion 28 and the compressor rotor extension 48, and the axial clearance between the adjacent ends of the extension 48 and the nose bullet 29, also establish a connection between the compressor inlet and the chamber 58.

It will therefore be seen that the chamber 58 contains the same gas as is dealt with by the compressor, but at a pressure intermediate the compressor inlet and outlet pressures, and that the maximum pressure in the said chamber will be limited by leakage through the said clearance and into the compressor intake. Besides supplying the chamber 56, the chamber 58 communicates with all other voids within the casing 11 so that the said gas is led to the vicinity of the opposite end of the sleeve 38. In this way the said gas is made available, as necessary, to the minute clearance between the sleeve 38 and shaft 22 at both ends of the bearing.

A gas thrust bearing is used having a rotary thrust bearing ring 59, held up to a shoulder of the sleeve 38 by a nut 60, which coacts with a stationary thrust bearing ring 61 to support thrust from the compressor rotor. The remote surface of the ring 61 (i.e., the upper surface in the figure) is provided with two diametrically-opposite, part-spherical seatings for the adjacent surfaces of bearing balls 62, 62, of which the opposite surfaces have a similar seating in the adjacent axial end of a floating ring 63. At its opposite axial end the ring 63 is provided with two diametrically-opposite, part-spherical seatings for the adjacent surfaces of bearing balls 64 which are spaced 90° from the balls 62 and coact with similar seatings in the adjacent axial end of an internal thrust plate 65. This plate is secured to the jacket 12 by a circle of screws 66 and it also supports circumferentially-spaced anchor screws, of which one is shown at 67, for one end of a respective tension spring 68 of which the other end is anchored to a pin 69 fast with the stationary thrust bearing ring 61. In this way the springs act to bias the ring 61 of the thrust bearing in the direction to locate the balls 62 and 64 in their coacting seatings.

By thus mounting the bearing ring 61 provision is made for the coacting bearing surfaces of the rings 59 and 61 to maintain uniform contact in spite of any slight deviation of either bearing surface from the true normal to the bearing axis.

The bearing surface of the stationary ring 61 is provided with logarithmic spiral grooves as presently described with reference to FIGURE 3.

It will be seen that there are sealing rings 70 and 71 for the outlet annulus 52, and that the composite casing for the electric-motor and compressor is a hermetically sealed one excepting for the compressor gas inlet and outlet. The ratio of the length to the diameter of the gas bearing between the sleeve 38 and shaft 22 is such, in accordance with well-known gas bearing practice, as to prevent failure of the gas film during the designed use of the bearing. Should any gas leak from the minute clearance, due to temperature or pressure changes, there is the previously mentioned supply of the gas at both ends of the sleeve 38 to replenish it. The whole arrangement avoids the necessity for any other lubricant, and this feature is of particular value in instances where the gas being compressed must be kept free from, say, lubricating oil or grease.

It will be seen that owing to there being no requirement, as in the prior proposal, for achieving alignment between two spaced bearings, and that as the stationary shaft 22 is shorter than the prior rotating one by at least the sum of the lengths of the two bearings previously employed, the load-carrying capacity of the bearing 22, 38 is greater than that of the prior arrangement using a rotating shaft of equal diameter to the said stationary one. It will also be seen that as the shaft 22 is stationary it does not have to transmit torque, as was the case with the rotating shaft of the prior arrangement, but that the torque is transmitted by the tubular extension 43 of the compressor rotor (which latter is of greater radius than the shaft 22 and therefore results in the critical speed of the rotating mass being elevated) and not by the sleeve 38 which latter is therefore relieved of any applied force tending to distort it.

Referring now to FIGURES 2 to 4, the textile spinning spindle 72 is formed with a coaxial bore having minute clearance from a stationary vertical shaft 73 in accordance with the invention (i.e., the clearance, as in the case of FIGURE 1, is preferably such that the ratio of its radial width to the radius of the shaft 73 is about $6 \times 10^{-4}$). Pinned at 74 within the top of the spindle 72 is a shaft 75 which rotates with the latter. An air bleed duct, for facilitating assembly of the parts, is shown at 75a.

The stationary shaft 73 is pinned at 76 adjacent its foot within a screw-threaded fitting 77 which extends through a clearance hole in a work-table 78 and is located by a lock-nut 79.

At its foot the spindle 72 is provided with a radially-extending flange 80 of which the underside constitutes one of two thrust bearing surfaces for supporting the weight of the spindle and of its attachments and load through a film of air.

The other of these two thrust bearing surfaces is provided on the top of a floatingly-supported, stationary ring 81 which is provided with the necessary up-lift by a ring-spring 82, bent laterally to present three equi-angularly spaced lobes at each axial side, reacting on a head 83 of the fitting 77. This ring-spring also serves the same purpose as the ring 63 and balls 62, 64 of FIGURE 1. For preventing rotation of the ring 81 it is provided in its underside with holes 84 for loose engagement by pins 85 held fast in the head 83.

In order to protect the thrust bearing between 80 and 81 there is an axially split cover ring 86 the parts of which can be placed in position for a bottom flange 87 to engage in a peripheral end groove of the head 83, and for a top flange 88 to extend with clearance into a peripheral channel of the spindle flange 80. This cover ring is held in position by a non-split retaining ring 89 having a bottom flange 90 which is trapped between the flange 87 and the work-table 78.

The thrust bearing surface of the stationary ring 81, as well as of the ring 61 of FIGURE 1, can be as shown in FIGURE 3, in which it is provided with very shallow logarithmic spiral grooves 91 (e.g., of a depth of the order of half a thousandth of an inch) which curve in the sense to promote an optimum shear effect on the gas in the thrust bearing, whereby to engender an optimum force tending to separate the two thrust bearing surfaces.

What I claim as my invention and desire to secure by Letters Patent of the United States is:

1. In an electric-motor-driven compressor and single hydrodynamic gas bearing combination comprising an electric motor rotor and a compressor rotor aligned and fast with each other, said single hydrodynamic gas bearing being the sole support for the rotors, said electric motor rotor having a coaxial cylindrical bore forming a surface of the gas bearing, said cylindrical bore being free from interruptions, a stationary shaft, said stationary shaft having a cylindrical portion which is of uniform diameter throughout its length, of said shaft forming a coacting surface of the gas bearing, said electric motor rotor bore surrounding said cylindrical portion of said shaft with minute clearance between their respective bearing surfaces, the ratio of the overlapped lengths of said bearing surfaces to their mean diameter being not less than one so that a gas in said minute clearance will act as a sole lubricating fluid for said bearing surfaces, and a casing to contain said electric motor and compressor, said shaft sealingly and rigidly supported at one end from an end wall of said casing, said casing having an opposite end wall provided with an inlet for a gas to be compressed and an outlet for the gas after compression, and said casing providing a communication for said gas to reach said minute clearance whereby the gas which is dealt with by said compressor also acts as lubricant for said bearing, said casing being otherwise hermetically sealed.

2. In an electric-motor-driven compressor and single hydrodynamic gas bearing combination comprising an electric motor rotor, and a compressor rotor aligned and fast with each other, said single hydrodynamic gas bearing being the sole support for the rotors, said electric motor rotor having a coaxial cylindrical bore forming a surface of the gas bearing, a stationary shaft, said stationary shaft having a cylindrical portion forming a coacting surface of the gas bearing, said electric motor rotor bore surrounding said cylindrical portion of said shaft with minute clearance between their respective bearing surfaces, the ratio of the overlapped lengths of said bearing surfaces to their mean diameter being not less than one so that a gas in said minute clearance will act as a sole lubricating fluid for said bearing surfaces, and a casing to contain said electric motor and compressor, said shaft sealingly and rigidly supported at one end from an end wall of said casing, said casing having an opposite end wall provided with an inlet for a gas to be compressed and an outlet for the gas after compression, and said casing providing a communication for said gas to reach said minute clearance whereby the gas which is dealt with by said compressor also acts as lubricant for said bearing, said casing being otherwise hermetically sealed.

3. In an electric-motor-driven compressor and single hydrodynamic gas bearing combination comprising an electric motor rotor, and a compressor rotor aligned and fast with each other, said single hydrodynamic gas bearing being the sole support for the rotors, said electric motor rotor having a coaxial cylindrical bore forming a surface of the gas bearing, a stationary shaft, said stationary shaft having a cylindrical portion which is of uniform diameter throughout its length, forming a coacting surface of the gas bearing, said electric motor rotor bore surrounding said cylindrical portion of said shaft with minute clearance between their respective bearing surfaces, and a casing to contain said electric motor and compressor, said shaft sealingly and rigidly supported at one end from an end wall of said casing, said casing having an opposite end wall provided with an inlet for a gas to be compressed and an outlet for the gas after compression, and said casing providing a communication for said gas to reach said minute clearance whereby the gas which is dealt with by said compressor also acts as lubricant for said bearing, said casing being otherwise hermetically sealed.

4. In an electric-motor-driven compressor and single hydrodynamic gas bearing combination comprising an electric motor rotor, and a compressor rotor aligned and fast with each other, said single hydrodynamic gas bearing being the sole support for the rotors, said electric motor rotor having a coaxial cylindrical bore forming a surface of the gas bearing, a stationary shaft, said stationary shaft having a cylindrical portion forming a coacting surface of the gas bearing, said electric motor rotor bore surrounding said cylindrical portion of said shaft with minute clearance between their respective bearing surfaces, the ratio of the overlapped lengths of said bearing surfaces to their mean diameter being not less than one so that a gas in said minute clearance will acts as a sole lubricating fluid for said bearing surfaces, and a casing to contain said electric motor and compressor, said shaft sealingly and rigidly supported at one end from an end wall of said casing, said casing having an opposite end wall provided with an inlet for a gas to be compressed and an outlet for the gas after compression, and said casing providing a communication for said gas to reach said minute clearance whereby the gas which is dealt with by said compressor also acts as lubricant for said bearing, said casing being otherwise hermetically sealed.

5. In an electric-motor-driven compressor and single hydrodynamic gas bearing combination comprising an electric motor rotor, and a compressor rotor aligned and fast with each other, said single hydrodynamic gas bearing being the sole support for the rotors, said electric motor rotor having a coaxial cylindrical bore forming a surface of the gas bearing, a stationary shaft, said stationary shaft having a cylindrical portion which is of uniform diameter throughout its length, forming a coacting surface of the gas bearing, said electric motor rotor bore surrounding said cylindrical portion of said shaft with minute clearance between their respective bearing surfaces, the ratio of the overlapped lengths of said bearing surfaces to their mean diameter being not less than one so that a gas in said minute clearance will act as a sole lubricating fluid for said bearing surfaces, and a casing to contain said electric motor and compressor, said shaft sealingly and rigidly supported at one end from an end wall of said casing, said casing having an opposite end wall provided with an inlet for a gas to be compressed and an outlet for the gas after compression, and said casing providing a communication for said gas to reach said minute clearance whereby the gas which is dealt with by said compressor also acts as lubricant for said bearing, said casing being otherwise hermetically sealed.

References Cited in the file of this patent

UNITED STATES PATENTS

| Number | Name | Date |
|---|---|---|
| 2,113,335 | Wallgren | Apr. 5, 1938 |
| 2,830,541 | Higgins et al. | Apr. 13, 1958 |
| 2,864,552 | Anderson | Dec. 16, 1958 |
| 2,889,474 | Macks | June 2, 1959 |
| 2,928,960 | Macks | Mar. 15, 1960 |
| 2,937,294 | Macks | May 17, 1960 |

FOREIGN PATENTS

| 726,018 | Great Britain | Mar. 16, 1955 |